United States Patent [19]

Takahara

[11] Patent Number: 4,730,247
[45] Date of Patent: Mar. 8, 1988

[54] DIGITAL INDICATION TYPE MEASURING APPARATUS AND MEASURED DATA STORAGE APPARATUS THEREFOR

[75] Inventor: Noboru Takahara, Tokyo, Japan

[73] Assignee: Mitutoyo Mfg. Co., Ltd., Tokyo, Japan

[21] Appl. No.: 646,979

[22] Filed: Sep. 4, 1984

[30] Foreign Application Priority Data

Sep. 5, 1983 [JP] Japan .................................. 58-162952
Sep. 5, 1983 [JP] Japan .................................. 58-162953

[51] Int. Cl.$^4$ ................................................ G01B 7/12
[52] U.S. Cl. ........................................ 364/560; 364/550
[58] Field of Search ................................ 364/560–562, 364/550; 33/166, 143 L, 164 R

[56] References Cited

U.S. PATENT DOCUMENTS

| | | | |
|---|---|---|---|
| 3,900,720 | 8/1975 | Konersmann et al. | 364/560 |
| 3,940,742 | 2/1976 | Hudspeth et al. | 340/172.5 |
| 3,942,157 | 3/1976 | Azure | 364/900 |
| 4,181,958 | 1/1980 | Juengel et al. | 364/560 |
| 4,225,209 | 9/1980 | Hughes | 439/344 |
| 4,377,850 | 3/1983 | Simpson | 364/561 |
| 4,410,230 | 10/1983 | SanMiguel | 439/682 |
| 4,516,213 | 5/1985 | Gidden | 364/483 |
| 4,580,226 | 4/1986 | Bennison | 364/554 X |

FOREIGN PATENT DOCUMENTS

| | | |
|---|---|---|
| 0044823 | 1/1982 | European Pat. Off. ............. 33/166 |
| 0157477 | 10/1985 | European Pat. Off. . |
| 51-49472 | 4/1976 | Japan . |
| 52-142444 | 11/1977 | Japan . |
| 56-167479 | 5/1980 | Japan . |
| 0139610 | 8/1982 | Japan .................................. 33/143 L |
| 1549191 | 7/1979 | United Kingdom . |
| 1549307 | 7/1979 | United Kingdom . |
| 2028508 | 3/1980 | United Kingdom .................. 33/166 |
| 2120424 | 11/1983 | United Kingdom . |

Primary Examiner—Gary V. Harkcom
Assistant Examiner—H. R. Herndon
Attorney, Agent, or Firm—Parkhurst & Oliff

[57] ABSTRACT

Measured data storage apparatus for digital indication type article measuring apparatus used to measure more than one type of article is connected to a main body of the measuring apparatus so as to be operatively transportable with the measuring apparatus for measuring the articles and removable from the measuring apparatus for reading of the stored contents of the storage apparatus by an external computer. The storage apparatus comprises data switch apparatus for controlling input of measured values to the storage apparatus, and data identifying apparatus operative with the data switch apparatus for storing in the storage apparatus identifying data associated with each inputted measured value signifying at least the article to which each measured value corresponds.

7 Claims, 8 Drawing Figures

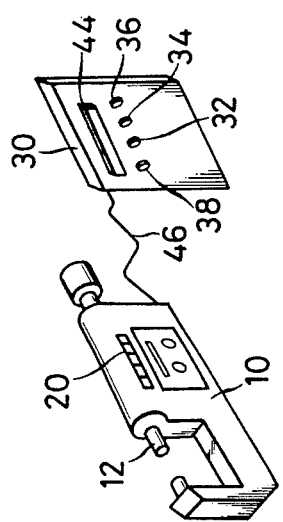
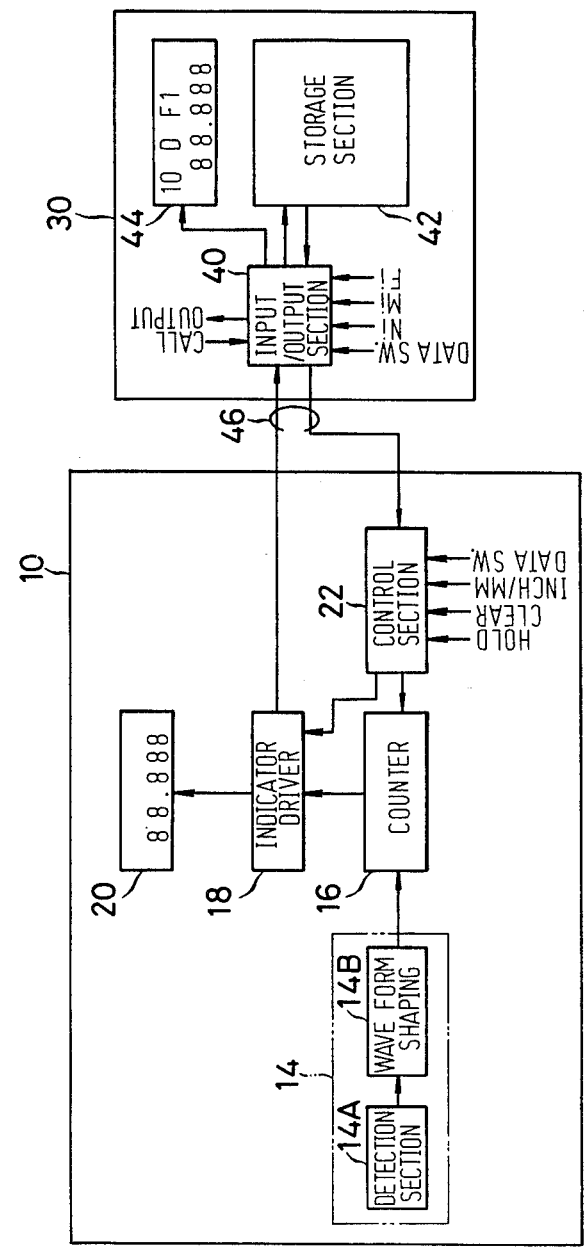
FIG. 1
FIG. 2

DIGITAL INDICATION TYPE MEASURING APPARATUS AND MEASURED DATA STORAGE APPARATUS THEREFOR

BACKGROUND OF THE INVENTION

1. Field of the Invention

This invention relates to digital indication type measuring apparatus and measured data storage apparatus therefor, and more particularly to improvements in digitial indication type measuring apparatus comprising an encoder connected to a measuring element for detecting a displacement of the measuring element, a counter for counting output signals from the encoder, and a digital indicator for indicating a value counted by the counter as a measured value.

2. Description of the Prior Art

In general, in measuring apparatus, such as slide calipers or a micrometer, for measuring a length of other dimension of an article, the displacement or movement value is measured of two measuring apparatus elements movable relative to each other, such as a measuring element which is movable relative to a main body of the measuring apparatus, or a slider which is movable relative to a column. A so-called "digital indication" type of such measuring apparatus for providing a digital indication of the measured value was heretofore known, one example of which comprises an encoder, a light source, a main scale, an index scale and a photoelectric transducer mounted in the main body of the measuring apparatus.

Compared with known measuring apparatus providing an analog indication of a measured value, the above-referenced digital indication type of measuring apparatus has the advantages of being, inter alia, more easily read, and easier to use because no special skill is required. however, in the conventional digital indication type of measuring apparatus, the indicating graduations used in the analog type of machine are simply replaced by a digital indicator. This has the disadvantage that the measured value indicated by the digital indicator must be read and transcribed by a worker in order for the measured value to be inputted into an independent or external computer or the like for computing a standard deviation, etc., or for use in quality control.

In order to overcome the aforementioned disadvantage, a digital indication type of measuring apparatus has heretofore been proposed wherein a digital output signal corresponding to the measured value is produced for inputting to an external computer. However, since it has been necessary to directly connect such digital indication type measuring apparatus to an external computer, such measuring apparatus has the practical disadvantage that the measurement site is restricted because of the installation requirements of the external computer. Consequently, the article to be measured must be removed from the work or processing site to a separate measurement site, thus decreasing work efficiency. In addition, the use of a simplified external computer which can be installed at the article processing site is made difficult by the temperature, vibration, noise and the like conditions present at the processing site. Moreover, the throughput capacity of such computers is limited. Also, the computers cannot be operated efficiently because measurements are generally made intermittently and take a long period of time to complete, which restricts the functioning of the computer for long periods of time. Further, such computers require preparation or maintenance to maintain the computers in a functioning condition.

Still further, the computational results in general are not obtained in real time and thus generally should be tabulated or displayed graphically, as well as data-analyzed to provide a reference or index for optimizing subsequent article processing. However, the measuring operation triggers the interrupt function of external computers, which prevents satisfactory utilization of the proper functions of an external computer.

In addition, the points of measurement generally vary with each article, which requires that the external computer be adjusted accordingly, thus necessitating an additional worker for this purpose. Further, the types of computations which can be performed is limited depending on the type of external computer which is connected to the measuring apparatus.

To overcome the above-described disadvantages of digital indication type measuring apparatus which is directly connected to an external computer, the use of a so-called data logger for temporarily storing the measured values has been proposed. However, the use of a general-purpose data logger for accumulation of the data from measuring apparatus requires a large-size device, which is particularly unsuitable for portable types of digital indication measuring apparatus.

SUMMARY OF THE INVENTION

The present invention has been developed to overcome the above-described disadvantages of the prior art and has as its first object the provision of digital indication type measuring apparatus of high practicality wherein measured values can be accumulated without directly connecting the measuring apparatus to the external computer, and moreover, the measured values can be readily inputted to the external computer.

The present invention has as its second object the provision of a measured data storage device suitable for use with digital indication type measuring apparatus in which the data input to the external computer and the identification of the type of data can be easily carried out.

In accordance with the present invention the aforementioned first object is achieved in digital indication type measuring apparatus comprising an encoder connected to a measuring element for detecting a displacement of the measuring element, a counter for counting output signals from the encoder and a digital indicator for indicating a value counted by the counter as a measured value, by providing computer readable portable data storage apparatus for storing measured values relating to a plurality of measured articles, the data storage apparatus being connected to a main body of a measuring apparatus so as to be operatively transportable with the measuring apparatus for measuring the article and removable from the measuring apparatus for reading of the stored contents of the storage apparatus by an external computer without interferring with the operation of the measuring apparatus digital indicator. The data storage apparatus comprises data input/output apparatus for controlling the storage of measured values, which apparatus comprises data switch apparatus for controlling input of the measured values to the storage apparatus, and data identifying apparatus operative with the data switch apparatus for storing in the storage apparatus identifying data associated with each inputted measured value signifying at least the article to which each measured value corresponds.

In one embodiment of the present invention, the data storage apparatus is releasably connected in proximity to the measuring apparatus main body by an electric cable. Accordingly, the present invention is readily applicable to digital indication types of measuring apparatus which produce a measured value output signal for inputting to an external computer.

In another embodiment of the present invention, the data storage apparatus is releasably mounted on the measuring apparatus main body, thereby facilitating measurement and the transport of the measuring apparatus. Further, the digital indicator of the measuring apparatus in this embodiment advantageously is responsive to the date input/output appratus for indicating the identifying data corresponding to the measured value being indicated, thereby obviating the need for a separate storage apparatus digital indicator.

In accordance with the present invention, the aforementioned second object is achieved by measured data storage apparatus for digital indication type article measuring apparatus used to measure more than one type of article wherein the storage apparatus comprises a data switch connected to a measured value output of the measuring apparatus for controlling the input of the measured values from the measuring apparatus to the storage apparatus. The storage apparatus further comprises: a first control switch for generating a control value specifying the number of different types of articles for which measured values are to be stored; a second control switch for generating a control value for each different article type to be measured specifying the number of articles of that type for which measured values are to be stored; and a third control switch for generating a control value for each different article type specifying the number of measuring points at which articles of that type are to be measured. The storage apparatus also comprises: data identifying apparatus responsive to the data switch and the controlled values generated by the first, second and third control switches for generating identifying data associated with each inputted measured value signifying the article type, the article number and the measuring point to which the measured value corresponds; storage memory apparatus for successively storing the inputted measured values and associated identifying data; and an output apparatus responsive to an external computer for outputting each stored measured value in conjunction with the identifying data associated therewith.

In accordance with the present invention, the data switch advantageously includes a switch mounted on the measuring apparatus as well as a switch mounted on the storage apparatus so that input of a measured value to the storage apparatus can be controlled from either the measuring apparatus itself or the storage apparatus.

In accordance with another aspect of the present invention, the storage apparatus is adapted to be carried by the operator while the measuring apparatus is being used, so that measurements can be effected easily.

The present invention takes advantage of the fact that it is usually unnecessary to input a measured value in real time to the external computer for computing data for quality control and the like. because the data storage apparatus of the present invention is removable from the measuring apparatus and portable therewith, measurement of an article can be effected without directly connecting the measuring apparatus to the external computer, and, upon completion of measuring, only the data storage apparatus needs to be connected to the external computer, and the stored contents can be read at the request of an external computer, thereby allowing the measured value to be readily inputted to the external computer.

Also, providing identifying data relating to article type, article number and measured points in association with the measured values inputted from the measuring apparatus by the data switch, data input is facilitated. Furthermore, by displaying the measured value data together with the identifying data, identification of the measured value data is facilitated.

According to the present invention, the measuring operation can be carried out and the measured values can be accumulated without directly connecting the measuring apparatus to the external computer, and moreover, the measured values can be readily inputted to the external computer. In consequence, it is not necessary to carry the article to be measured into or out of a special environment such as a computer room, and the measuring apparatus may be used in the vicinity of the article to be measured, e.g., around an article processing machine. Furthermore, data processing by the external computer is not interrupted by the measuring operation for a long period of time, thus improving the efficiency of utilization of the external computer. A further significant advantage is that similar data of different types can be readily inputted to the external computer depending on the data necessary for quality control and the like.

Also, according to the present invention, the measured value data can be readily inputted and identified in a measured data storage device.

BRIEF DESCRIPTION OF THE DRAWINGS

The exact nature of this invention, as well as other objects and advantages thereof, will be readily apparent from consideration of the following detailed description of preferred embodiments with reference to the accompanying drawings, in which like reference characters designate the same or similar parts throughout the figures thereof, and wherein:

FIG. 1 is a perspective view showing the general arrangement of a first embodiment of a digital indication type micrometer and a measured data storage device therefor constructed according to the present invention;

FIG. 2 is a schematic block diagram showing details of the first embodiment;

DETAILED DESCRIPTION OF THE PREFERRED EMBODIMENTS

Figure 3:
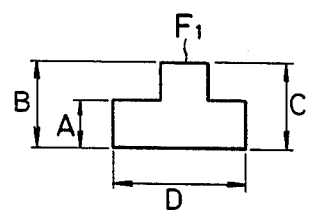
FIGS. 3 and 4 are front views showing exemplary articles to be measured and examples of the measured points.

Referring to FIGS. 1 and 2, a first embodiment of the present invention comprises a digital indication type micrometer 10 and a portable, battery-driven data storage device 30 operatively connected to micrometer 10 by a cable 46, the length of which is selected to allow storage device 30 to be portable together with micrometer 10 and to be carried by the user of micrometer 10 while measurements are being made. As shown, micrometer 10 comprises an encoder 14 having a detection section 14(A) and a waveform shaping circuit 14(B) connected to a measuring element 12 of the micrometer for detecting a displacement of the measuring element and producing output signals indicative of such displacement. Advantageously waveform shaping circuit 14(B) includes a direction discriminator circuit (not shown) and a dividing ciruit (not shown) as necessary.

Micrometer 10 further comprises a counter 16 for reversibly counting output signals from encoder 14; and indicator driver 18 for converting the value counted by counter 16 into signals suitable for digital indication; a digital indicator 20 driven by the output signals from indicator driver 18 for indicating the value counted by counter 16 as a measured value; and a control section 22 for holding and clearing the value counted by counter 16 and the indicated value in digital indicator 20, and for effecting inch/mm change-over.

Still referring to FIGS. 1 and 2, data storage device 30 comprises an article type number setting switch 32 for specifying the number F of different types of articles to be measured; an article-volume number setting switch 34 for specifying the number M of articles of each type to be measured; and a measuring point number setting switch 36 for specifying the number N of measuring points to be measured for each type of article being measured. Data storage device 30 further comprises a data switch 38 for controlling the input of measured value data generated by micrometer 10; and an input/output circuit 40 including data identifying circuitry for generating identifying data associated with each inputed measured value signifying which article type $F_i$, which article $M_i$ of the article type $F_i$, and which of the measuring points $N_i$ to which to each measured value relates. Data storage device 30 also comprises a storage memory 42 for storing the inputted measured value data from micrometer 10 and the asssociated identifying data generated by input/output section 40 such that the measured value data and associated identifying data can be outputted by the input/output section 40 in response to a request by an external computer. Data storage device 30 further comprises a data indicator 44 for indicating measured value together with the associated identifying data. Micrometer 10 and data storage device 30 are interconnected such that data storage device 30 can be disconnected from micrometer 10 without interfering with the operation of the digital indicator 20 of micrometer 10.

The only function of data storage device 30 is data storage. Device 30 does not perform any computations.

Advantageously, data switch 38 comprises a first switch mounted on the data storage device 30 and a second switch mounted on the main body of micrometer 10 so that input of measured values from micrometer 10 to data storage device 30 can be controlled by either one of the data switches, thereby facilitating the measurement and data storage process.

Figure 4:
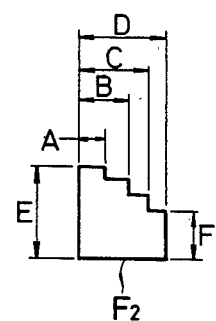

The operation of data storage device 30 will now be described with reference to an example in which two types of articles $F_1$ and $F_2$, having the shapes shown in FIGS. 3 and 4, respectively, are to be measured. The number $M_1$ of $F_1$, articles is 100, and the number $N_1$ of measuring points for the articles $F_1$ is 4 (including points A, B, C and D shown in FIG. 3). The number $M_2$ of $F_2$ articles is 200, and the number $N_2$ of measuring points for the articles $F_2$ is 6 (including points A, B, C, D, E and F shown in FIG. 4).

Figure 6:
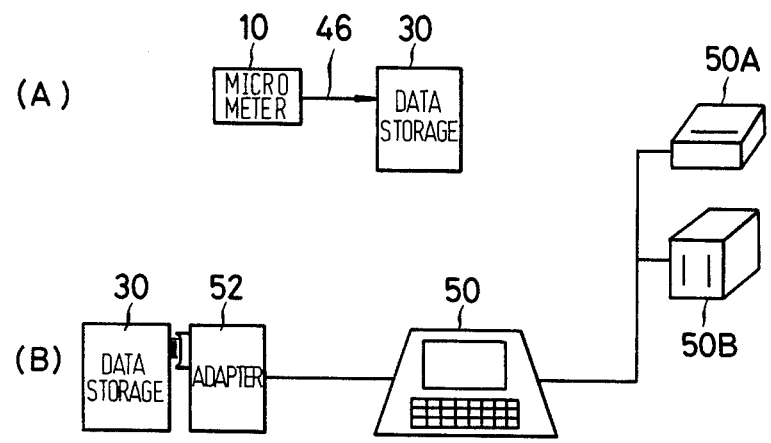
FIGS. 6(A) and 6(B) are diagrams showing, respectively, the interconnections between a digital indication type micrometer and a data storage device of the present invention at the time of measuring, and the interconnections between the data storage device and an external computer at the time of data inputting.

First, during the measuring operation, data storage device 30 is electrically connected to micrometer 10 through cable 46, as is schematically shown in FIG. 6(A). The number $F_1$ (2) of article types to be measured, the number $M_i$ of articles of each type to be measured ($M_i$=100, $M_2$=200), and the number of measuring points $N_i$ for each article type ($N_i$=4 and $N_2$=6) are set by the use of switches 32, 34 and 36, respectively. Data storage device 30 is thereafter placed in a convenient location, for example, the pocket of the operator, and the measuring operations are performed with micrometer 10 being held in the operator's hands.

Figure 5:
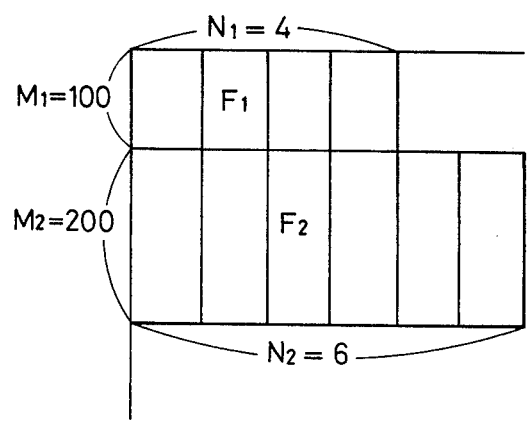
FIG. 5 is a diagram showing examples of data storing locations in the storage section of the data storage device used in the first embodiment.

Upon completion of each meauring point measurement, data switch 38 is operated, thereby causing each measured value to be successively inputted into storage device 30 and stored in storage memory 42 in association with the corresponding identifying data. As shown in FIG. 5, the measured value data may advantageously be accummulated in memory storage 42 in an array format wherein the measured value data for each type $F_i$ of article being measured is stored in a separate array, and within each array, the measured value data for each measuring point $N_i$ is stored in a separate column and the measured value data for each successive one of the $M_i$ articles being measured is stored in a separate row.

In addition, both the measured value and the associated identifying data are indicated in the data indicator 44, so that the data being accummulated can be identified. As an example, FIG. 2 shows data indicator 44 indicating that the measured value being accummulated is the measured value for the fourth measuring point D of the tenth article of the type $F_1$.

After data switch 38 has been activated to input a measured value into storage deivce 30, the next measuring operation is initiated by moving measuring element 12 of micrometer 10.

Upon completion of data accummulation in data storage device 30 after a series of measurements has been finished, data storage device 30 is disconnected from the main body of digital indication micrometer 10 as shown in FIG. 6(B), and, for example, is taken to the location of an external computer 50, e.g., in a computer room, and the data storage device 30 is connected to the external computer 50 through an adapted 52. As shown, computer 50 comprises a printer 50(A) and a floppy disk drive 50(B). Then, the data stored in the data storage device 30 are quickly read into the external computer 50, statistical data necessary for quality control of the article processing and the like are computed by external computer 50, and the results are outputted in useable forms such as drawing figures, tables, graphs and the like.

In the embodiment shown in FIGS. 1 and 2, the data storage device 30 is connected to micrometer 10 through cable 46 which has a length allowing ready transport of storage device 30 together with micrometer 10. Data storage device 30 is also provided with a data indicator 44 for use exclusively with storage device 30, so that the present invention can be readily used with any digital indication type micrometer having the conventional external signal output.

Figure 7:
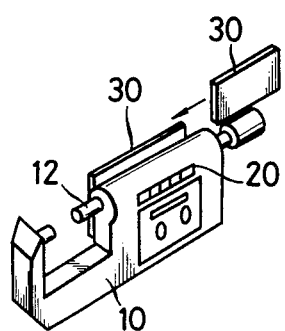
FIG. 7 is a perspective view showing the arrangement of a second embodiment of a digital indication type micrometer and measured data storage therefore constructed according to the present invention.

Data storage device 30 need not be connected to micrometer 10 as shown in the embodiment of FIGS. 1 and 2. For example, as shown in the embodiment of FIG. 7, micrometer 10 and data storage device 30 can be adapted for direct mounting of storage device 30 on the main body of micrometer 10 without the use of a connecting cable or the like. With this embodiment, the portability and the measurement process of micrometer 10 are facilitated. In addition, the digital indicator 20 of micrometer 10 may be modified to indicate the indentifying data in addition to the measured value, thereby eliminating the need for a separate data indicator on data storage device 30.

The present invention has been described in connection with a digital indication type micrometer and a measured data storage device therefor. However, the applicability of the present invention is not limited to this type of measuring apparatus. It will be apparent to those of ordinary skill in the art that the present invention is applicable to other portable types of digital indication measuring apparatus, such as digital indication type slide calipers, as well as stationary, nonportable type digital indication measuring appartus.

What is claimed is:

1. Digital indication type article measuring appartus comprising: an encoder connected to a measuring element, for detecting a displacement of said measuring element; a counter for counting output signals from said encoder; and a digital indicator for indicating a value counted by said counter as a measured value and for producing a measured value output; wherein the improvement comprises:

computer readable portable data storage means responsive to said measured value output for directly storing measured values relating to a plurality of measured articles, said data storage means being connected to a main body of said measuring apparatus so as to be operable and transporable with said measuring apparatus for measuring the articles and separable from said measuring apparatus for reading of the stored contents of said storage means by an external computer without interfering with the operation of said digital indicator;

data switch means for controlling input of said measured values to said data storage means; and data identifying means responsive to said data switch means for automatically generating and storing in said data storage means predetermined identifying data associated with each inputted measured value signifying the article to which each measured value corresponds.

2. Digital indication type article measuring apparatus as set forth in claim 1 wherein said data storage means is releaseably connected to said measuring apparatus main body by an electric cable.

3. Digital indication type article measuring appartus as set forth in claim 1 wherein said data storage means is releasably mounted on said measuring apparatus main body.

4. Digital indication type article measuring apparatus as set forth in claim 1 wherein said digital indicator indicates the identifying data corresponding to the measured value being indicated.

5. Measured data storage apparatus for digital indication type article measuring apparatus used to measure more than one type of article; said storage apparatus comprising:

input means releasably connected to a measured value output of the measuring apparatus and data switch means connected to said input means for controlling the input of measured values from the measuring apparatus to said storage apparatus;

first control means for generating a control value specifying the number of different types of articles for which measured values are to be stored;

second control means for generating a control value for each different article type to be measured specifying the number of articles of that type for which measured values are to be stored;

third control means for generating a control value for each different article type specifying the number of measuring points at which articles of that type are to be measured;

data identifying means responsive to said data switch means and said control values generated by said first, second and third control means for automatically generating identifying data associated with each inputted measured value signifying the article type, the article number, and the measuring point to which the measured value corresponds;

storage memory means for successively storing the inputted measured values and associated identifying data; and output means responsive to an external computer for outputting each stored measured value in conjunction with the identifying data associated therewith.

6. Measured data storage apparatus as set forth in claim 5 wherein said data switch means includes first switch means mounted on said storage apparatus and second switch means mounted on the measuring apparatus.

7. Measured data storage apparatus as set forth in claim 5 wherein said storage apparatus is adapted to be carried by the operator while the measuring apparatus is being used.

* * * * *